United States Patent
Meadows

(10) Patent No.: US 6,845,382 B2
(45) Date of Patent: Jan. 18, 2005

(54) PET IDENTIFICATION SYSTEM AND METHOD

(76) Inventor: Louis B. Meadows, 8140 Orion Ave., Van Nuys, CA (US) 91406

(*) Notice: Subject to any disclaimer, the term of this patent is extended or adjusted under 35 U.S.C. 154(b) by 11 days.

(21) Appl. No.: 10/770,120

(22) Filed: Feb. 2, 2004

(65) Prior Publication Data

US 2004/0153477 A1 Aug. 5, 2004

Related U.S. Application Data

(63) Continuation of application No. 09/747,533, filed on Dec. 22, 2000, now abandoned.

(51) Int. Cl.$^7$ .............................................. G06F 17/30
(52) U.S. Cl. ......................... 707/104.1; 382/115; 427/1
(58) Field of Search ............................ 707/104.1, 102, 707/10; 382/115; 427/1

(56) References Cited

U.S. PATENT DOCUMENTS

| | | | | |
|---|---|---|---|---|
| 4,379,178 A | * | 4/1983 | Meadows et al. ............... | 427/1 |
| 4,699,077 A | * | 10/1987 | Meadows et al. ........... | 118/31.5 |
| 5,462,597 A | * | 10/1995 | Jubran ....................... | 118/31.5 |
| 5,879,453 A | * | 3/1999 | Streeter et al. ............ | 118/31.5 |
| 6,401,095 B1 | * | 6/2002 | Adler .......................... | 707/10 |

* cited by examiner

Primary Examiner—Safet Metjahic
Assistant Examiner—Sana Al-Hashemi
(74) Attorney, Agent, or Firm—Trojan Law Offices

(57) ABSTRACT

A system and method for identification and retrieval of lost pets such as dogs. The system includes methods to obtain accurate noseprints either by chemical transfer system or with closeup photography for entry into a database. The system assigns locations where noseprints are acquired with an account number which in turn automatically assign an identification number to a dog when registered. Data relating to and including the noseprint, a photograph, description, and information regarding the owner are transferred to a central database optionally from pet shops by E-Mail or by giving all photos and registration forms to a dog owner who then fills out forms and sends all materials to central office via mail. The system includes a program to automatically assign an account number to a pet shop or store and an identification number for the dog. The program includes photograph enhancing software as well as pattern recognition software to identify a lost dog via the noseprint. To recover a lost dog, the system is scanned either by identification number, if known, or by using the pattern recognition software to compare a noseprint of a found dog with those in the noseprint database to identify and locate the owner of the pet. If a match is achieved by an identification number or by pattern recognition of noseprints, the owner is notified and the lost dog can be retrieved.

17 Claims, 10 Drawing Sheets

PET IDENTIFICATION SYSTEM AND METHOD

CROSS-REFERENCE TO RELATED APPLICATIONS

This application is a Continuation of applicants' patent application Ser. No. 09/747,533, filed Dec. 22, 2000 now abandoned.

BACKGROUND OF THE INVENTION

1. Field of the Invention

The present invention relates to a method and system for identifying animals and more particularly relates to a method for identifying pets such as dogs using noseprint identification.

2. Background Information

There are a number of reasons why it is important to provide identification of pets. One important reason is to identify a pet so that it can be returned to its owner if lost. Another purpose would be to certify the identity of a pet before or after competition such as horse racing or dog shows. Another important use for identification would be for forensics to determine the identity and ownership of an animal involved in property damage or personal injury.

Presently there are systems for identifying animals by applying a permanent mark on animals. Branding of cows, sheep, etc. is still widely used. Also identification tags can be attached to the animal's ears, nose, or attached to a collar worn on the neck of an animal. Another method is the use of an ink code of lettering, letters, numbers, or other symbols that can be tattooed on the skin of an animal. Also, the insertion of a readable (MICRO) chip into the body of a dog or animal can be used. The microchip uses numbers only, which can identify the owner of the dog via a database. The disadvantages of these systems are that chips can be removed, as can tags and collars. Tattoos can also be altered. It has been known that chips used at animal shelters can create mistakes with ownership, by lack of follow-through by shelter personnel to change ownership records when necessary.

It was recognized that pore and crease patterns on the noses of dogs are unique and can be utilized for forensic identification as fingerprints are used for positive identification of people. A dog's noseprint for example can be used for positive identification which is acceptable for registration and identification of purebred dogs by kennel clubs, specifically the Canadian Kennel Club, and recognized by the Canadian Agricultural Department since 1938. The Canadian Kennel Club sold a kit that consisted of a pre-inked noseprint pad with a paper form for registration. The ink was a viscous, organic, stamp-pad type of ink that was applied to the nose of the animal or dog. The ink remains solvent which was irritating to the animal and to the dog owner as well.

To use this system the surface of the pet's or dog's nose was first dried with a clean cloth to remove access moisture. The pre-inked plate is then applied to the front and sides of the dog's nose with a rolling motion. The noseprint pad was slightly flexible to confirm to the curvature of a dog's nose. Once the rolling motion was applied to the dog's nose with the flexible ink pad, it was pulled away with a quick motion to avoid smudging the noseprint. The print was then transferred from the inked nose to the paper registration form which was allowed to dry. This method is very difficult to make acceptable prints, even for persons experienced with this type of ink product. The print must be complete, legible, not smeared or smudged, of the correct density, not too light or too dark. Non-acceptable prints can be caused by too much moisture on the pet's or dog's nose, too little or too much ink, or by incorrect or inconsistent hand pressure. For these reasons this method was found to be tedious and not very successful. Although the Canadian Kennel Club registered tens of thousands of purebreds using the conventional ink product, too many of the dog owners were turned down because poor quality nose prints were taken which could not be identifiable.

There are a number of patents that disclose inkless fingerprinting system that use water-based inks in a two part system to develop fingerprints on a substrate impregnator with a coated layer containing a developer for the other part of the system. For example the patent of Meadows et al., U.S. Pat. Nos. 4,379,178 and 4,699,077. Other patents include U.S. Pat. No. 4,029,012 of Smith et al; U.S. Pat. No. 4,705,299 of Hedgecoth et al; U.S. Pat. No. 5,363,453 of Gagne et al; U.S. Pat. No. 5,522,623 of Soules et al; U.S. Pat. No. 5,879,453 of Streeter et al; U.S. Pat. No. 5,673,647 of Pratt; and U.S. Pat. No. 5,928,708 of Hansmire et al.

BRIEF DESCRIPTION OF THE INVENTION

The purpose of the present invention is to provide a good system and method for identifying animals and more particularly a system for identifying pets such as dogs. An object of the invention is to help an owner locate and identify a lost dog or identify the owner of a dog that has strayed.

The system involves acquisition or capturing of a noseprint of the pet or dog, entering data related to the dog and its owner into a program that automatically assigns an identification characteristic and storing that information for retrieval on demand. The information is useful to not only identify a particular pet or dog but can be used to assist in finding a lost animal or pet or certifying a show animal or used for positive identification at any time, as is done with an individual's fingerprints used for personal positive identification. Each dog's nose is unique to itself because it has been proven that no two dog's noses are the same.

The system disclosed is an improved method for identifying animals by means of a noseprint. The noseprint is readily acquired without the need to apply pressure or inkpads to the nose which eliminates incidents of smudged noseprints. The absence of pressure also eliminates variation in density from noseprints. The system of the invention uses materials that are non-irritating to the animal's nose. One such method of acquiring the noseprint is by close-up photograph. The close-up photograph is acquired by using a high-magnification camera such as a Polaroid Micro 5 SLR at up to 5× magnification. This camera allows very close focusing for perfect noseprint every time they are photographed.

Today's digital cameras can be used but it is more difficult to obtain a nose image with them than it is with the Polaroid camera mentioned above because the person seeking a properly focused noseprint with a digital camera, as well as all 35 mm cameras and camcorders, must follow instructions perfectly. Because the skill of the dog owner taking the photo of the dog's nose is limited and not mechanically controlled, a high chance of error is prevalent. Using the Polaroid Micro-5 SLR is mechanical because the camera shows two beams of light. When the person taking the photo moves closer to the dog's nose, the two beams start coming together into a single beam. When this happens the camera is in perfect focus and after actuating the shutter, in 60 seconds you get a perfect image of the dog's nose. Done right, it's 100% effective.

Another method to be used is a pre-inked special type of plastic material inked on one side of the flexible plastic incorporated into a small frame which can fit into the palm of the owner's hand, and which uses the same method as above to obtain the pet's or dog's noseprint. A special registration form is attached to the inked side of the hand-held disposable nose printer. When rolled on the dog's nose, the ink never touches the pet's or dog's nose and the light pressure applied puts the dog's noseprint on the registration form quite definitively and cleanly, obtaining a clear noseprint. This method is quite successful and acceptable and eliminates variations of specific problems, besides being non-aggressive and non-irritating to the animal's nose. Noseprints using this method seem to be quite successful and the users of this product should feel very confident in obtaining good, readable noseprints by following proper instructions.

Another method of obtaining noseprints for a degree of success utilizes a two-part aqueous-based (inkless) system to form an image of an animal's nose. One part of the system contains a color forming compound which is impregnated into a deposit on a layer on an identifying record card or sheet of paper. The second part of the system comprise aqueous solution of material which reacts with the compound to form a dark color, preferably black. The material is dissolved in the aqueous solution. The solution is preferably impregnated into a flexible towelette. The towelette is soft and damp permitting a general application of a thin film of solution on the surface of the pet's or dog's nose. The registration form is impregnated with developing solution so when the towelette forming compound is wiped on the dog's nose and then pressed against the impregnated registration form, a black impression of the dog's nose appears and dries almost instantly, which then becomes a permanent print which can be used for positive identification for the life of the dog.

After capturing the noseprint image by close-up photography, an inkless method or an inking method, the image is digitized by being scanned into a computer. Data is also input into the computer including but not limited to a photograph of the pet, details of the pet owner as well as a description of the pet. The capturing of the image and input of data can be at numerous locations such as pet stores and the like. Each pet store optionally collects and transmits the data with the noseprint image and a photograph of the dog through the Internet to a central receiving office for storage in a database.

Each pet store or shop is assigned an identification number that includes the identification assigned to the particular location as well as the ID assigned to the pet. For example, it could consist of a series of numbers and a letter with certain numbers and letters identifying the location where the data was collected and the remaining portion of the ID identifying the particular pet. The pet shop or store has the option of retaining the information or transmitting the data to the central receiving office and then deleting the information after confirmation of receipt.

The system includes a program for image processing and produce plastic collar tags containing other animal identification information such as the dog's name, kennel club, registration number, weight, color of fur, color of eye, and owner identification such as name, address, and phone number. An ID card or badge can also be produced for attachment to the dog as a collar tag with an ID card produced for the owner with photograph of dog and a photograph of dog's noseprint directly onto the ID card.

The central receiving office stores the noseprint image, photograph, and other data relating to the dog including identifying information as well as owner information. The central office includes programs to enhance the image stored in the database as well as a printer to print ID cards and pet collar tags which are then sent to the pet owner with a thank-you letter, and other pertinent animal information such as lost pet application.

The central receiving office assists in identifying a particular pet or dog that is lost or needs to be certified for purposes of a show. In this situation, the pet owner would submit a form with information including data from the ID identifying the pet. The central receiving office would then transmit either through the Internet or by mail or fax the data and photographs to shelters, veterinarians, and pet shops in the geographical area of the owner where the dog nose program was purchased originally.

Identification of any pet found would be enabled by obtaining the identification number if the animal has a collar ID tag. If not available, they will get a description of the dog and attempt to locate the pet in the central office database. If the animal has an ID tag, it is quickly located and the owner notified to retrieve the pet.

The system also includes a method of identifying an animal to reunite a lost pet with the owner or allow an owner to identify a found pet. For example, a shelter can send a stray dog's noseprint to the central headquarters to track down an owner. Conversely, if an owner has an identification card with an image of the pet's nose it can be used to provide a noseprint for comparison with noseprints in the database in a search for a lost dog. An image processing program that includes pattern recognition at the central office compares the noseprint of the dog found to noseprints in the central office database or a look-alike dog where a noseprint could be taken and sent to central office for comparison of two noseprints to identify the database animal. Twelve to twenty-five points of identical characteristics in noseprint comparison is generally considered sufficient to indicate a match and identify the dog. If they match, they can notify the owner of a positive match. If they do not match, the dog owner is advised that the pet found is not his and they wait for the next animal to be found.

The system can also be used to positively identify an animal in a dog show if his pedigree should be questioned. A nose imprint can be taken and compared to noseprints in the central office database by using the pattern recognition software.

The above and other objects, advantages, and novel features of the invention will be more fully understood from the following detailed description and the accompanying drawings, in which:

DETAILED DESCRIPTION OF THE INVENTION

Figure 1:
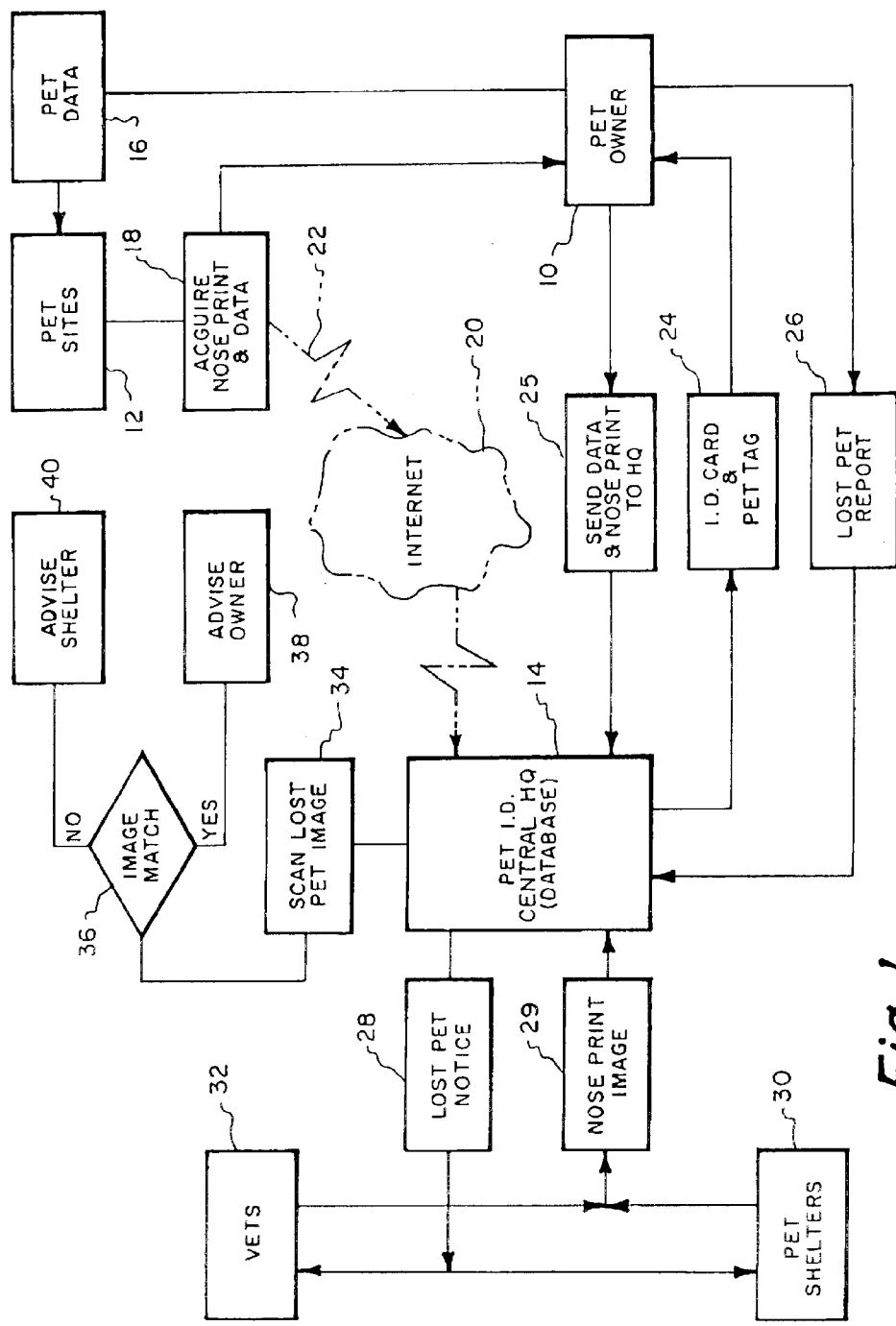
FIG. 1 is a block diagram of the overall pet identification, transmission, and storage system according to the invention.

An overall block diagram of the pet identification system according to the invention is illustrated in FIG. 1. The method and system are particularly applicable to pets such as dogs but can be applied to other pets. However the system will be described with relation to identifying and storing information relating to dogs. A dog or pet owner 10 receives a subscription package either from a pet site 12 such as a shop or store, or directly from pet identification central headquarters 14. The subscription package includes an application detailing information about the dog including local veterinarians and pet shelters. The dog owner 10 will then take the data and information regarding the dog 16 to a pet shop, pet store 12 or other location for recording the information. Another option is to have a pet shop or store or other site 12 acquire a noseprint and data 18 for transmission through internet 20 to pet identification central headquarters 14 as indicated by the dotted line 22. Preferably, the noseprint is delivered back to pet owner 10 for mailing 25 to pet central headquarters 14. A pet shop or store 12 may enter the data into a computer and transmits the data over the internet by E-Mail to pet central identification headquarters 14 for direct storage in the pet database.

Registration can be either at pet shops or similar sites 12 or at pet central identification headquarters 14 and includes the dog's description, noseprint, and preferably a full-body photograph. A pet identification number is automatically assigned either at pet shop 12 or central headquarters 14. The identification is automatically generated by a program that assigns an account number if the information is received from pet site 12 and an identification number for the dog. All data entered into the central headquarters database 14 can be retrieved at any given time.

The dog identification, noseprint, and photograph are used to generate an identification card and collar tag 24. The identification card and collar 24 are then sent to the pet owner 10 along with a form for reporting a lost dog and various other printed materials.

Should a dog be lost, lost pet report 26 is sent to central headquarters 14 by pet owner 10. Central headquarters 14 then sends out a lost pet notice 28 to veterinarians 30 and to pet store 12 where the data originated and to local pet shelters 32. Generally about 90% of pets are found within a few miles radius of the point where they are lost so that is where the search is concentrated. The lost pet notice 28 is sent to veterinarians 30 and pet shelters 32 and the pet store or site where the purchase originated from first in the general area within a few miles of the pet owner or the area where the dog was lost.

Optionally a noseprint 29 of any dog that is suspected of being the lost dog is sent from the veterinarians 30 or shelters 32 back to central headquarters 14 to find the owner of the dog or find a dog lost by an owner. Central headquarters then scans the lost dog images 34 received from veterinarians 30 and pet stores or shelters 32 comparing noseprints to database dog noseprint. An image comparison is made by pattern recognition program 36 to determine if there is a match. If there is an image match, a notice 38 is sent to dog owner 10. If there is no image match, notice 40 is sent back to the veterinarian 30, pet store, or pet shelter 32 that sent the noseprint.

The system and method may also be used to find the owner of a stray pet with or without a collar tag. Present systems have no way of identifying a stray dog if the collar tag is lost. However with the present system, a stray dog or pet may be returned to an owner if the animal's noseprint is in the central headquarters database. A noseprint of the stray dog can be sent by a shelter, veterinarian, etc. to central headquarters for comparison with noseprints in the database. If the noseprint is in the database, the owner can be found and notified his dog has been found.

An important feature of the invention is the method of obtaining a good, accurate noseprint of the dog. It is important to acquire a noseprint that is accurate; a photograph in focus which can produce a very clear definitive noseprint even seen with naked eyes. Previous attempts to use inking methods to obtain noseprints was tedious and generally unsuccessful and finally was abandoned because of its inaccuracy. The improved methods of the present invention have solved the problem of obtaining an accurate, reliable noseprints that can be identifiable for comparison if need be.

Figure 2:
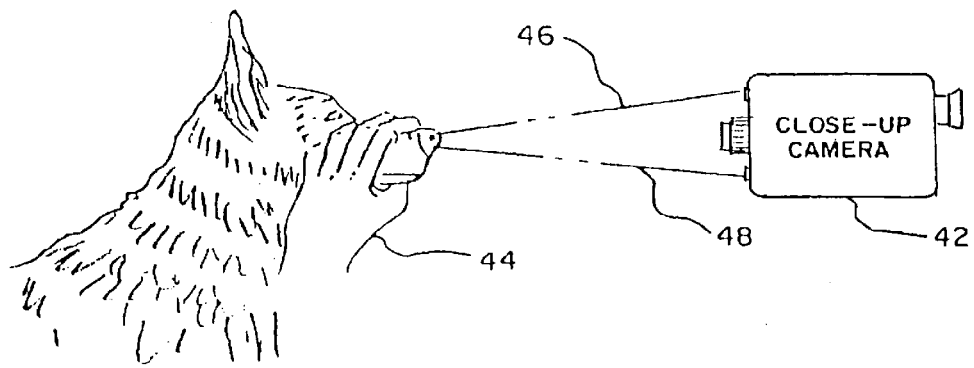
FIG. 2 illustrates a method of capturing a noseprint with a close-up camera.
Figure 3:
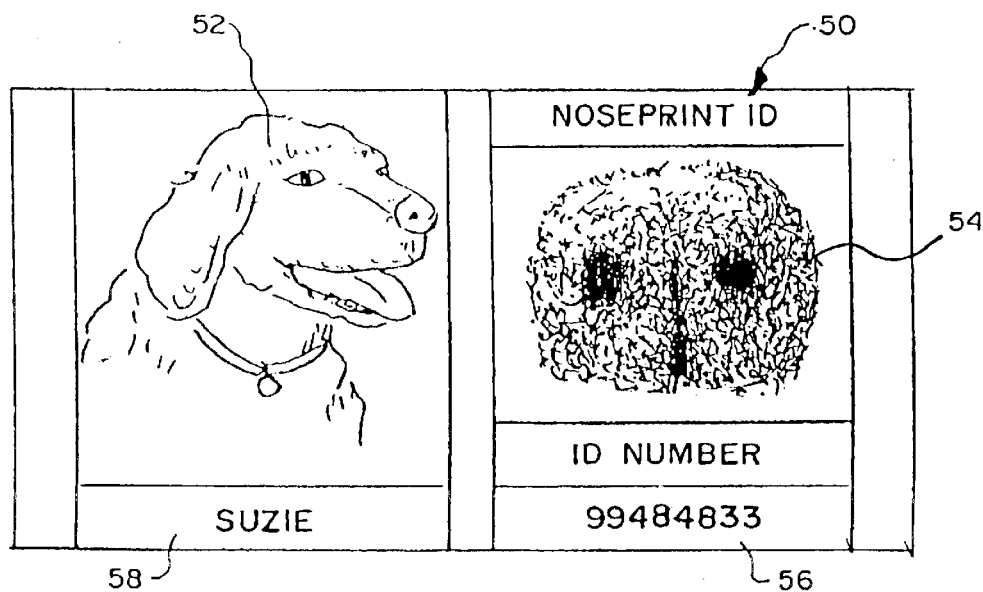
FIG. 3 illustrates a stored photo-identification for printing with an image processing program.

One preferred method of obtaining an accurate noseprint is with a closeup camera 42 as illustrated in FIG. 2. A closeup camera such as a Polaroid Micro 5 SLR with a 3× or 5× magnification achieves an excellent in-focus photograph of the dog's nose. The use of the closeup camera has resulted in accurate noseprints nearly 100% of the time. To acquire a noseprint, the owner holds dog's muzzle 44 and two light beams 46 and 48 from closeup camera 42 come together as camera 42 moves closer to the dog's nose. With the dog owner 44 holding the dog's head steady for a second or two, an in-focus noseprint can be acquired with camera 42. In approximately sixty seconds a good quality photograph is developed. Another photograph of the entire dog can then be taken which is then entered into the computer database by scanning. A sample photograph ID card 50 will show the dog's picture 52 noseprint 54 and unique registration number 56 in addition to the dog's name 58 as shown in FIG. 3.

Figure 7:
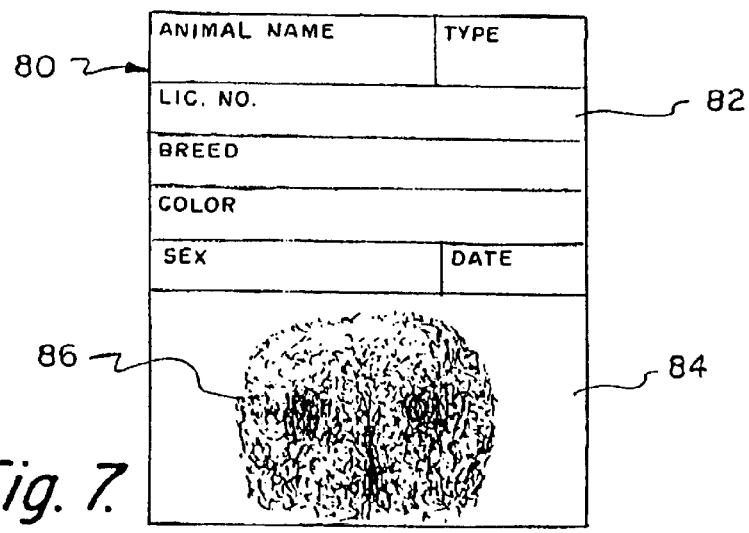
FIG. 7 illustrates a noseprint card produced from the applicator of FIGS. 4 and 5.
Figure 8A:
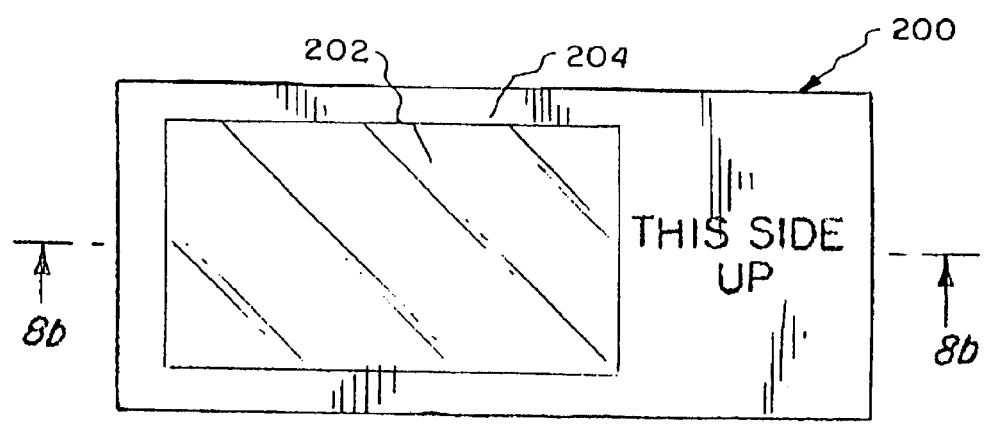
FIGS. 8(a) through 8(c) illustrate another method of acquiring a noseprint using a pre-inked flexible pad.
Figure 8B:
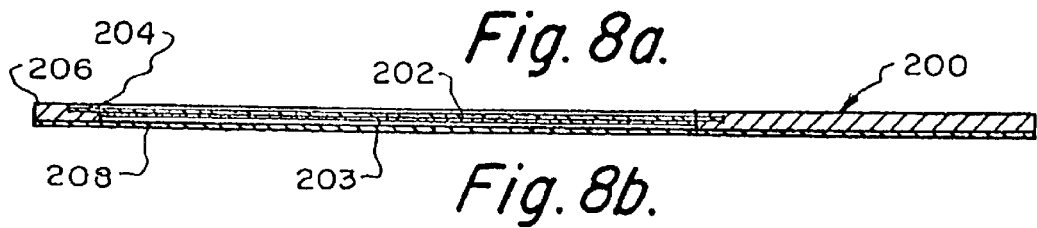
Figure 8C:
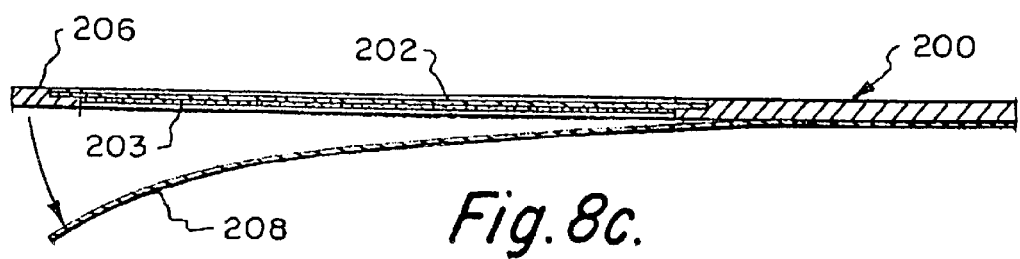

Another preferred method of obtaining a good noseprint is with a special pre-inked two-part flexible pad 200 as shown in FIGS. 8(a) through 8(c). One side of flexible pad 200 has a flexible plastic material 202 in a window 204 of a frame 206 comprising one half or side of the pad. The other half or side of pad 200 is comprised of a special registration form 208 similar to the form 80 shown in FIG. 7. Form 208 is sealed around its periphery with window 202 aligned with area 84 (FIG. 7) of the registration form 208. Pad 200 is preferably rectangular in shape and will fit comfortably in a dog owner or person's hand. The interior surface of flexible plastic window 202 is coated with an indelible ink 203.

Obtaining a noseprint is by a method similar to that shown in FIGS. 6(a) through 6(f) described in greater detail hereinafter. Since the entire pad is quite flexible, window area can be rolled on a dog's nose pressing ink 203 on the interior side of plastic window 202 against the pet's or dog's nose forming a noseprint 86 (FIG. 7). This method is preferable as ink 203 on the inside of plastic window never comes in contact with the dog's nose and only a light pressure is needed to create a dog's noseprint on the area 84 of the registration form 208.

Ink 203 forms definitely and clearly a clean noseprint 86 as shown in FIG. 7. This method is efficient and acceptable and eliminates some of the previous problems with obtaining clean noseprints as well as being non-aggressive and non-irritating to the animal. Noseprints required using this method can be quite successful and users of inking pad 200 should feel very confident of obtaining a good, readable noseprint by following the simple instructions.

Another option is to add a pleasing scent to the surface of pad 200. This will encourage the dog to sniff at pad 200 easing the process of taking the noseprints. The material to create the scent can be incorporated in removable cover 206 or some attractive scent smeared on the surface of window portion 202.

Figure 4:
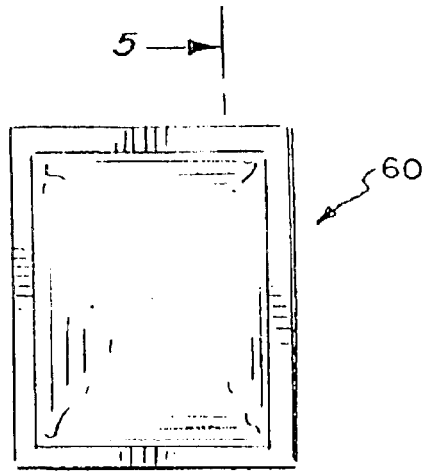
FIG. 4 is a front elevational view of a sealed, metal salt applicator providing another method of obtaining a noseprint according to the invention.
Figure 5:
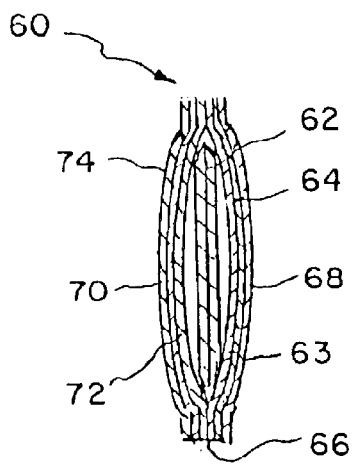
FIG. 5 is a sectional view taken at 5—5 of FIG. 4.

Another optional but less preferred method of obtaining a noseprint is with an inkless system illustrated in FIGS. 4 through 7. Referring now to FIGS. 4 and 5, the sealed metal salt applicator 60 comprises a porous pad 62 impregnated with marking composition sealed within enclosure 63 that has a very low moisture vapor transmission rate under normal ambient storage conditions, such as from −20 degrees F. to 115 degrees F. The water vapor permeability as measured by ASTM D697 method is below 0.5 and preferably below 0.2 grams/24 hr/mm thickness/cc Hg at 25 degrees C. The enclosure is preferably formed of a soft, flexible film, such as a low water vapor transmission resin or a thin foil metal, such as aluminum and preferably a combination thereof. A flat, edge-sealed packet as best illustrated in FIG. 5 is a particularly preferred form of the enclosure.

The packet is formed of a top sheet 64 attached its four edges by means of a seal 66 to a bottom sheet 68. The seal 66 can be formed by a wet adhesive, but is preferably formed by applying a layer 70 of a thermoplastic, such as polyethylene or polypropylene to the inner surfaces of a central vapor barrier film 72, such as a sheet of aluminum foil, and applying heat to fuse the layers 70 together. The outer surfaces of the aluminum foil can contain a layer 74 of a tougher resin, such as a Nylon (polyamide) or Mylar (linear polyester), to provide resistance to wrinkling or cracking, and to provide a surface for imprinting product name or instructions. The foil can be replaced with a synthetic resin film having good vapor barrier characteristics, such as polyvinylidene floride.

The porous pad 62 is a hydrophilic material which is impregnated with the marking composition. The pad should not have a surface capable of imprinting its pattern on a dog nose, such as a sponge with pores larger than ridge separations on a finger, or a stiff, textured paper. Best results are achieved with stretchable, creped paper towlettes. The important characteristic is the amount of solution impregnated into the paper. For 5 inch by 8 inch (40 square inches) folded, paper towlettes, it has been found that at an impregnation of 1.66 cc of marking solution or less, the print is incomplete and light. At an impregnation of 2.2 cc of marking solution or more, the print smudges or smears. About 1.8 cc of liquid per 40 square inches appears to be optimum.

The marking solution impregnated into the pad comprises a solution of a water-soluble, solvent-lubricant. The solution may also contain a small amount of a wetting agent or detergent. The solution generally contains, on a relative basis, 20 to 100 parts by weight of solvent; 2 to 30 parts by weight of metal salt; and optionally, 0 to 20 parts of water. A small amount of detergent, such as 1 to 10 grams of Aerosol OT (74% AQ), may be added. The ingredients are mixed to form a clear solution which is then soaked into the pad. The solution enters the pores of the paper pad.

The soluble metal salt reactive with the hydroxyphenolic developer can be a metal from groups I to VIII of the periodic table, and the anion may be inorganic, such as halide, sulfate or ferrocyanide. A preferred marking ingredient, due to cost, availability, nontoxicity and safety, is ferric chloride. Ferric chloride may be used in a mixture with 5 to 30% of its weight of ferrous chloride. The solvent for the salt is preferably a liquid that does not evaporate under ambient conditions, and also preferably is a lubricant to lubricate the movement of the finger as it moves over the paper pad. Preferred solvent-lubricants are materials, such as glycerine, and alkylene glycols, such as ethylene glycol or propylene glycol or various low molecular weight polyether liquids based on ethylene and/or propylene oxide. A suitable example of a pad soaking solution follows:

EXAMPLE 1

| MATERIAL | AMOUNT |
| --- | --- |
| Glycerine | 23,866 grams |
| $FeCl_3$ $^6H_2O$ | 5,818 grams |
| $FeCl_2$ $^4H_2O$ | 763 grams |
| Aerosol OT | 8 ml |

The hydroxyaromatic developer compound that forms the marking reaction with the metal salt is impregnated onto a substrate suitably a fibrous substrate, such as a paper sheet or noseprint ID card 80 shown in FIG. 7 by impregnation from solution. The card 80 can have a data receiving area 82. The marking solution and a noseprint receiving area need only be impregnated into the noseprint portion 84 of the card to form an impregnation field 86.

The metal salt is preferably a salt of a transition metal, such as iron, titanium, vanadium, chromium, magnesium, cobalt, nickel, copper, molybdenum, tungsten, and the like with an anion, such as ferride, citrate, sulfate, nitrate, stearate, acetate, formate, phosphate and the like.

The preferred developing ingredients are quinolinol derivatives, preferably 8-hydroxy-quinoline and various substitute derivatives thereof alone or in combination with a polyhydroxy phenol compound, such as trihyldroxy benxoic acid, pyrogallol, catechol, gallic acid, propyl gallate, and the like. The developing reaction should be such as to give a clear and distinct image, preferably a very dark, black-colored image. The impregnating composition is formed as a solution in a common solvent. Solvents, such as acetone are utilizable; however, for inhalation reasons and due to the tendency of acetone to dissolve preprinted areas of the noseprint card, it is preferred to utilize an alcohol solvent, suitably a lower alkanol, such as methanol, ethanol or mixtures thereof. The developing composition contains, based on 100 grams of solvent, 10 to 40 parts by weight of marking compound, and 1 to 10 parts of the higher molecular weight dibasic/acid additive of the invention. The composition may also contain from 0.1 to 3 parts of a finely divided silica as a thickener. The preferred composition contains a mixture of a trihydroxybenzene, such as propyl gallate and 8-hydroxy-quinoline in a ratio of at least five to one of the gallate to hydroxy-quinoline, preferably at least ten to one. The preferred dibasic acid is azelaic acid. A card impregnating solution is made by heating the solvent gently with stirring to dissolve ingredients while maintaining a maximum temperature of 45° until the azelaic acid is dissolved, then removing the heat and adding the finely divided silica, such as Cab-O-Sil, if desired.

A suitable example of practice follows:

EXAMPLE 2

| MATERIAL | AMOUNT |
| --- | --- |
| Denatured Alcohol | 1540 Ml |
| Propyl Gallate | 240 grams |
| 8-Hydroxy-Quinoline | 15.75 grams |
| Azelate Acid | 60 grams |
| Cab-O-Sil M5 | 7.5 grams |

The noseprint cards are coated with this solution or preferably imprinted by means of the water fountain of an offset press on a basis of 0.01 to 10 pounds of impregnating solution for 3,000 square feet of cards. It has been determined that for normal cards and good imaging, the coating basis can generally be 0.5 to 1.0 pounds per 3,000 square feet of cards.

Noseprint of a dog's nose can be made by the procedure illustrated in FIGS. 6(a) through 6(f).

Layout the necessary supplies before beginning to noseprint your dog. One person can easily perform the procedure but if two people are available that would make the process easier.

Figure 6A:
FIGS. 6(a) through 6(f) are schematic representation of the steps of obtaining a noseprint utilizing the applicator illustrated in FIGS. 4 and 5 according to the invention.
Figure 6D:
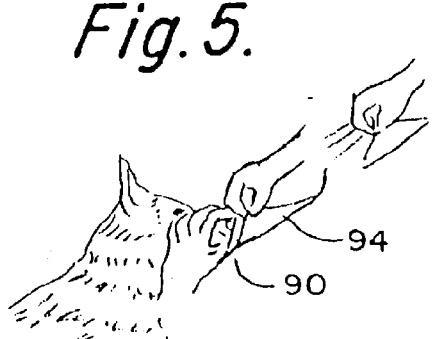
Figure 6B:
Figure 6E:
Figure 6C:
Figure 6F:
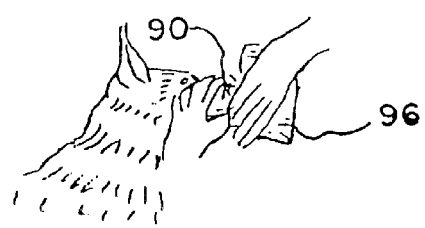

Hold the dog's muzzle 90 firmly and wipe and dry the dog's nose with a towel 92 (FIG. 6(b)) of any absorbent material in order to eliminate excess moisture.

Once dry, apply the Pad Towlette applicator 94 to the nose holding the muzzle 90 closed to prevent the dog from licking the noseprint solution off with their tongue. It is important not to apply too much solution which is not needed and can smudge the nose impression.

In one quick motion, press the supplied practice strip 94 lightly and squarely against the nose. It is not necessary to press hard. Only a light touch of strip 94 to the nose to obtain a clear print is needed. Quickly pull the paper straight away from the nose. The paper should not be slid away from the nose because this can smudge the noseprint.

The noseprint should be clear. If it is smudged, it was pressed against the nose too hard. The chemistry of the solution will develop the noseprint, not the amount of pressure.

Once the method has been practiced, the System is applied using the Registry paper such as a 5–10 mil thick flat or semi-gloss sheet of paper or a 5–15 mil thick card stock impregnated with polyhydroxy aromatic developer.

A clear noseprint 86, as shown in FIG. 7, is now ready to be registered, and is identifiable from other dogs of the same breed.

The card and packet weigh less than two ounces and can be mailed at minimum cost. The noseprinting system of the invention is low-cost, fast, convenient and yields excellent prints in a clean, simple method administered by the dog owner.

Figure 12:
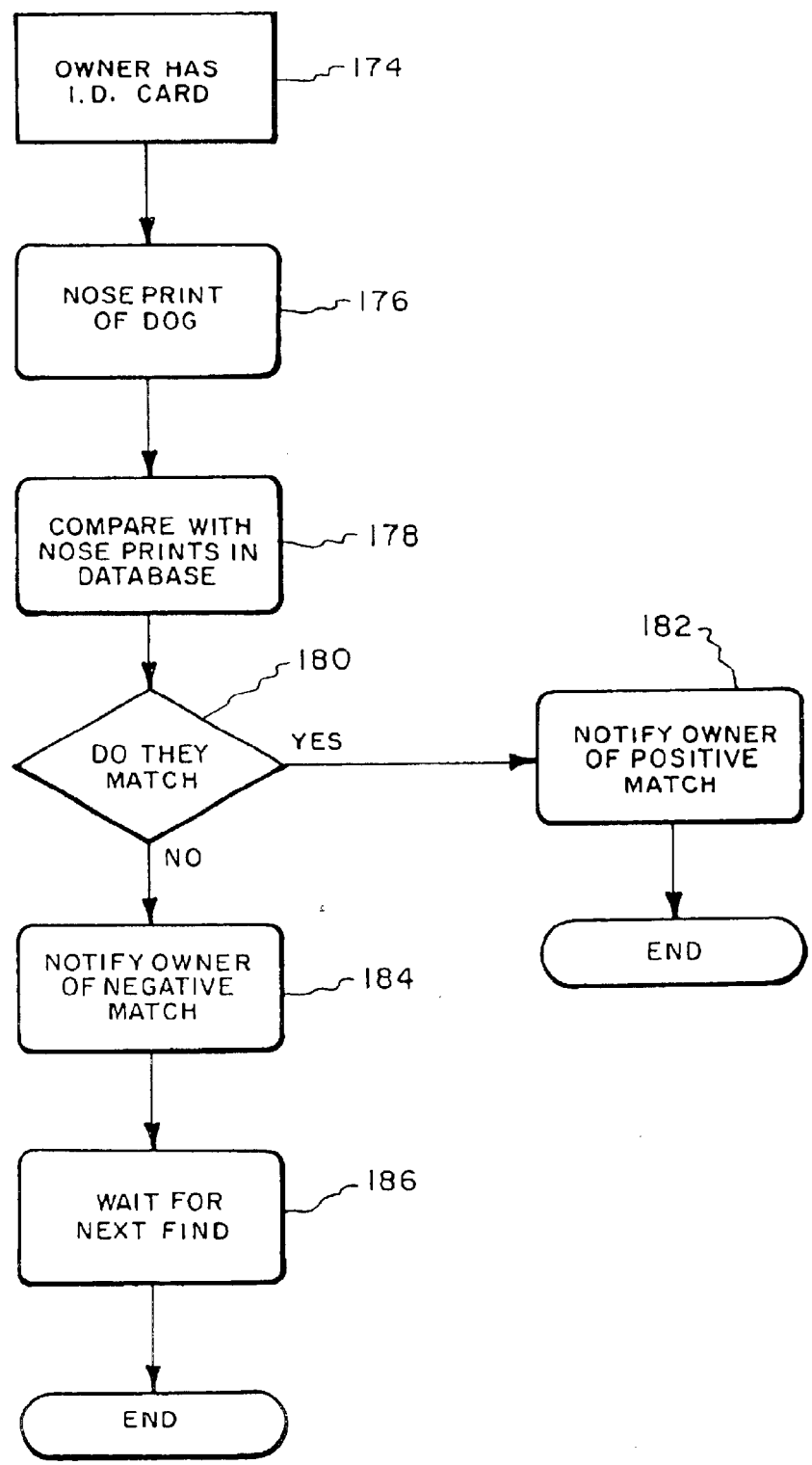
FIG. 12 is a flow diagram illustrating the procedure for an owner claiming a found pet utilizing the registration and identification system.

A further aspect of the invention is illustrated in FIGS. 3 and 12. A plastic badge 50 containing the noseprint 54, photograph 52, and other identifying information such as name 58 and ID number 56 can be scanned, digitized and printed on the front face of a dog nose ID badge ID card 50 by a software program, computer scanner and printer. The rear face of the card 50 as shown in FIG. 12 can contain fields describing the dog by coat color 51, eye color 53, breed 55, weight 57, sex 58 and registered owner, address and telephone number 59.

Episuite Professional Software by G & A Imaging Ltd. can be utilized to create a pre-configured database and special manipulation of software to create ID card and dog collar tags.

The process of creating the animal badge consists of entering the animal's biometric noseprint ID and other information such as the name, the breed and description of the animal into a pre-configured database, capture a 24 bit JPEG color photograph of the animal, and capture the animal's noseprint using a capturing device capable of producing easily identifiable biometric images. The captured information is then printed using a PVC card printer onto a durable CR-80 media. To ensure quality, the noseprint is printed using pure black generated from the printer's carbon print ribbon patch or an ink jet or laser printer.

Figure 9A:
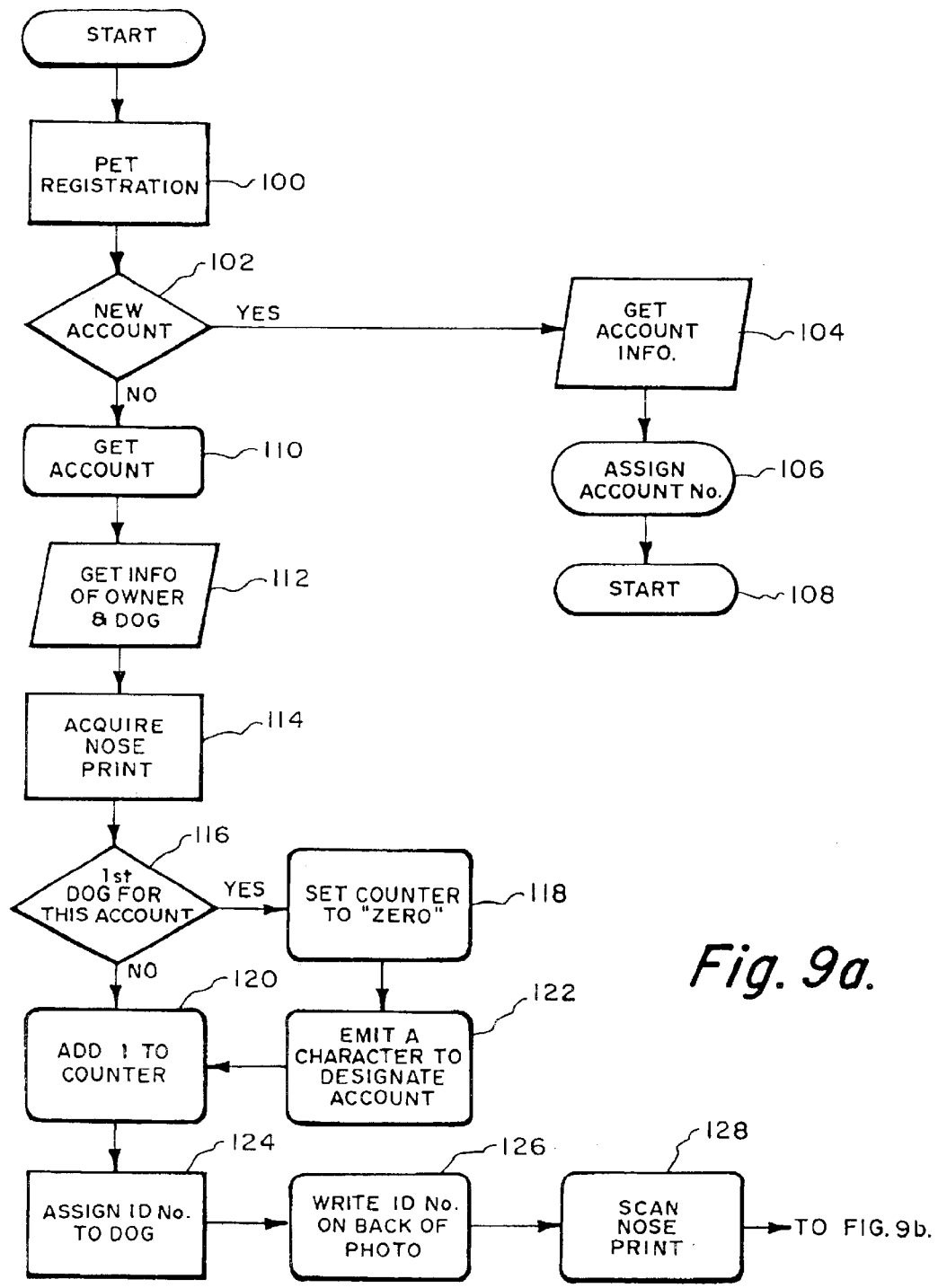
FIGS. 9(a) and 9(b) are a flow chart of the pet registration and identification system.
Figure 9B:
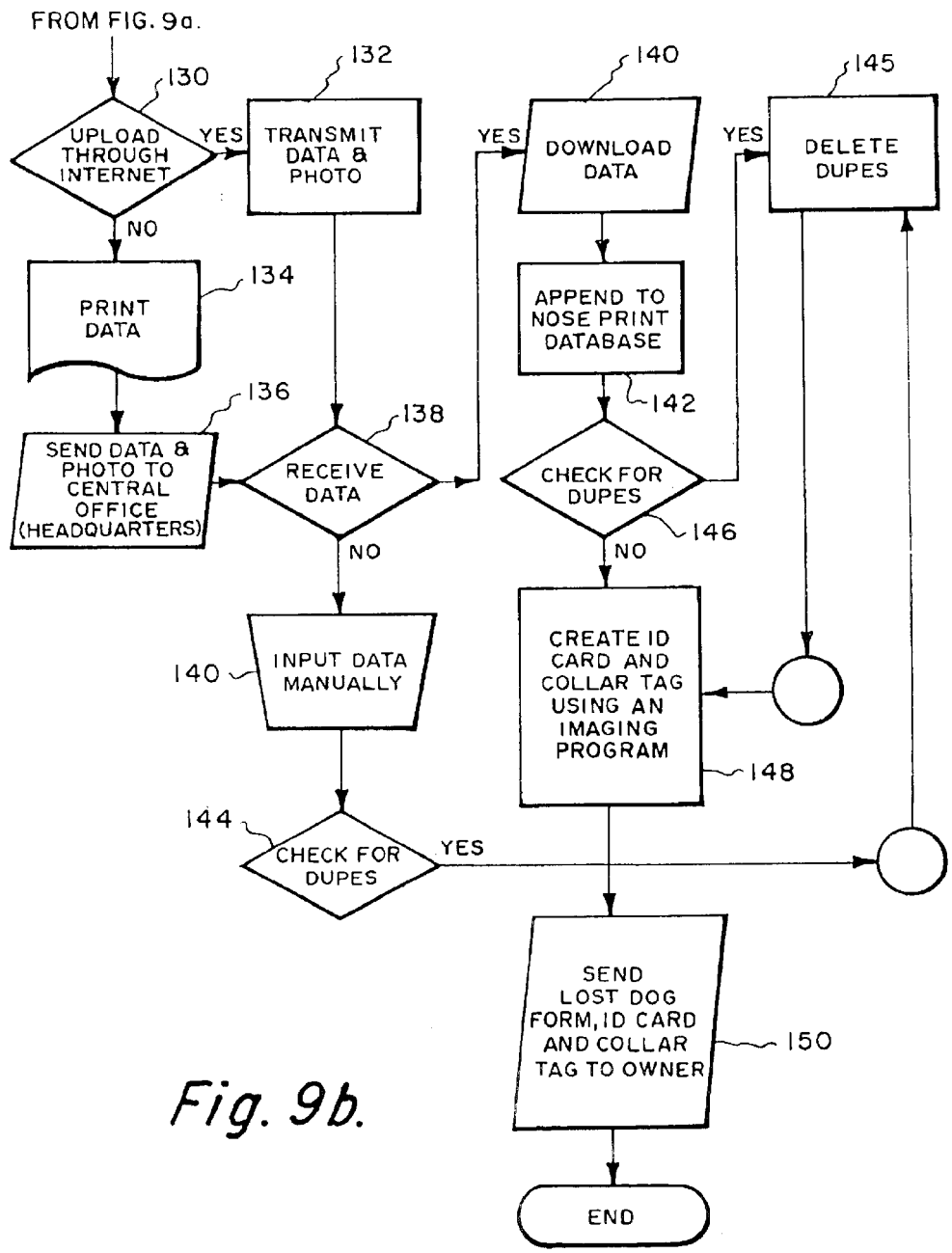

A flow diagram of the overall system is illustrated in FIGS. 9(a) and 9(b). The operation of the retrieval system after the data and noseprint identifying the dog are entered into database are shown in the flow diagrams of FIGS. 9 through 11. The pet identification system shown in the flow diagram of FIGS. 9(a) and 9(b) starts with pet registration 100 which checks whether this is a new or existing account 102. If an existing account, the system will get account information 104, assign an account number 106, and then start the registration processing at 108. If it is not a new account, it will get account number 110, get the information of the owner and dog, including noseprint 112.

The next step in the process is to acquire or capture a noseprint 114 either using the inkless or inking systems previously described or using a closeup camera such as a Polaroid Micro 5 SRL with 3× or 5× magnification with 60 second development of photograph.

The system then checks 116 whether this is the first dog for the account. If it is, the counter for establishing identification is set to "zero" 118. By this account, it means the particular pet shop or store 12 (FIG. 1) that are registered and assigned an account number. They are registered and assigned an account number and the apparatus for obtaining noseprint is delivered to the pet shop or store. If this is not the first dog for the account entered at the pet shop, a "1" is added to counter 120 to establish another identification number. Successive numbers are added to the account number to provide a unique identification number for each dog registered. If this is the first dog or pet for the pet shop or store account, the counter is set to "zero" 118 and the program emits a character 122, preferably a letter or letters to designate an account. After an ID number has been generated by setting the count to "zero" and then begin counting an ID number 124 is assigned to a dog. The program then includes writing the ID number of the dog on the back of the photograph 126 taken and scanning the noseprint into the system 128.

The next step is the transmission of the information to the central headquarters 114 (FIG. 1). The system permits sending data by E-Mail 130 by transmitting the data, photograph, and noseprint to the central headquarters or if not sent by E-Mail, prints and delivers the data and photograph 134 to the dog owner. The owner 10 then sends the data and photograph 136 to central headquarters 14. If transmitted by E-Mail 138, the information is downloaded 140 and appended 142 to the noseprint and identification database. If delivered to the owner by printing 134, it is then sent to the central office 136 where it is received 138 and manually or electronically entered 140. The system checks for duplicates at 144 or 146 which are deleted 145.

An ID card and collar tag are then created using a (video imaging) program. A photo processing program such as Polaroid Photomax can be used to enhance the photograph and noseprint before printing the identification card and collar tag for delivery to the pet owner 10. The system includes sending the ID card, collar tag, and a lost dog form 150 to the owner after being created at central office 14.

Figure 10:
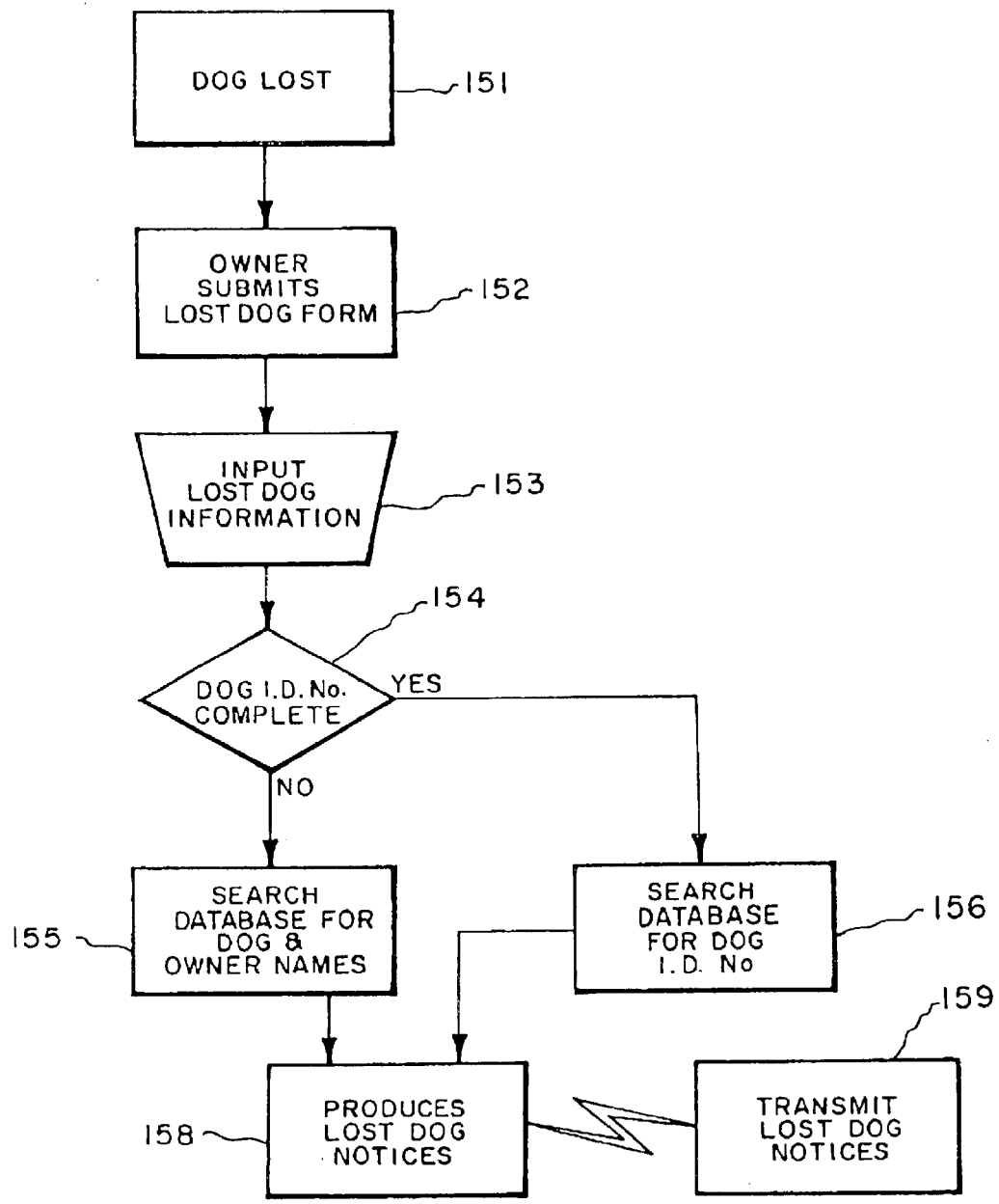
FIG. 10 is a flow diagram illustrating an owner's search for a lost pet utilizing the registration and identification system.

The steps involved when a dog strays or is lost is illustrated in the flow diagram of FIG. 10. Pet owner 10 (FIG. 1) prepares and submits lost dog form 152 to report a dog lost 151 to the central office 14. If the dog ID is complete 154, a search through the database for the dog ID number 156 is made. If the dog ID number is not complete, a search of the database for the names of the dog and owner 155 is made. The system program produces lost dog notices 158 which are preferably transmitted 159 by facsimile to pet shelters, veterinarians, pet shops and stores.

Figure 11:
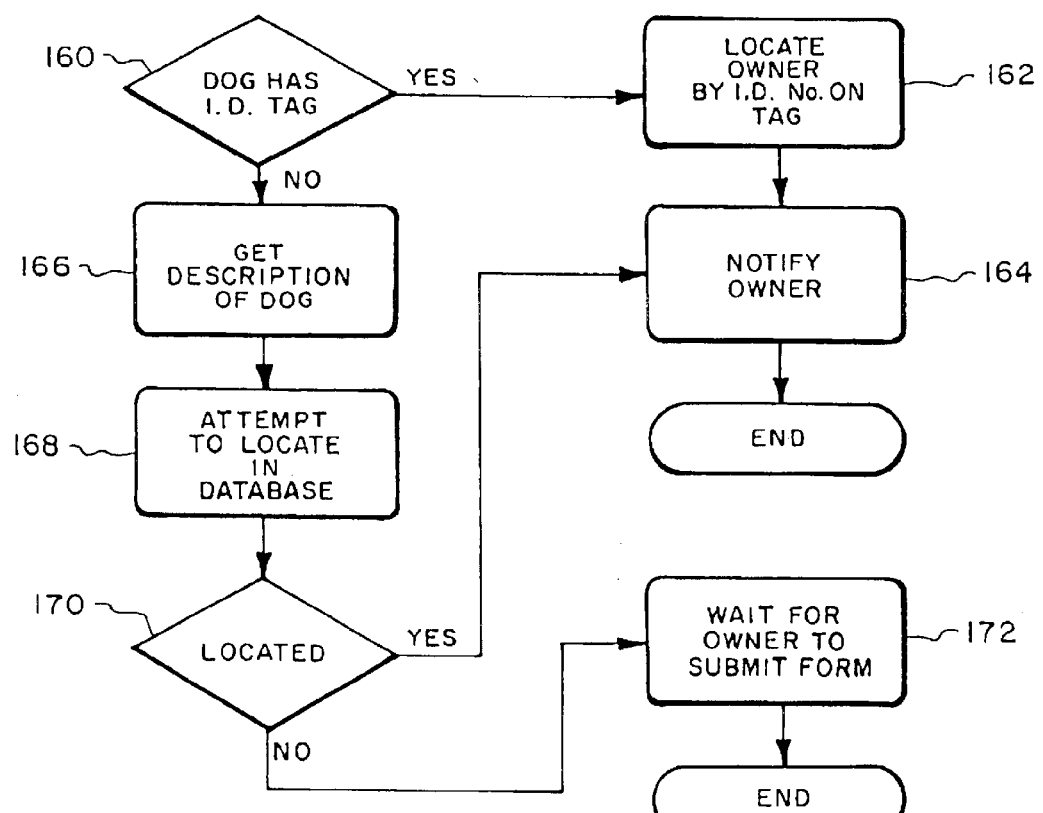
FIG. 11 is another flow diagram illustrating the identification of a pet for retrieval or certification utilizing the registration and identification system.

If a dog is discovered at veterinarian, shelter, or pet shop in the area, the system proceeds as shown in the flow diagram of FIG. 11. If the pet has a collar tag 160, the system will locate the owner 162 by the ID number on the tag and the owner will be notified 164. If the dog found has no collar tag, a description of the dog will be obtained 166 and an attempt will be made to locate the dog in the noseprint database 168. If the dog is located in the database 170, the owner is notified 164. If the dog is not located in the database, the system waits for the owner to submit a lost dog form 172.

A flow diagram for identifying a dog claimed by an alleged owner is illustrated in FIG. 12. If the owner has an ID card 174, a noseprint of the dog is obtained 176 and compared with photographs and noseprints in central headquarters database 178. Various programs are available allowing noseprints to be compared using a technique of pattern recognition to identify the particular dog in the database and the rightful owner. If the pattern recognition comparison results in a match 180, the owner is notified of a positive match 182. If they do not match, the owner is notified there is no match 184 and the system waits for the next find 186.

The system disclosed in the flow diagram of FIG. 12 can also be used to certify dogs entered into a dog show. If there is some question about the pedigree or ownership of a dog being shown in a dog show, the system can identify the dog by using the pattern recognition comparison technique to identify the dog and certify that dog for officials of the show if on our database.

Figure 13:
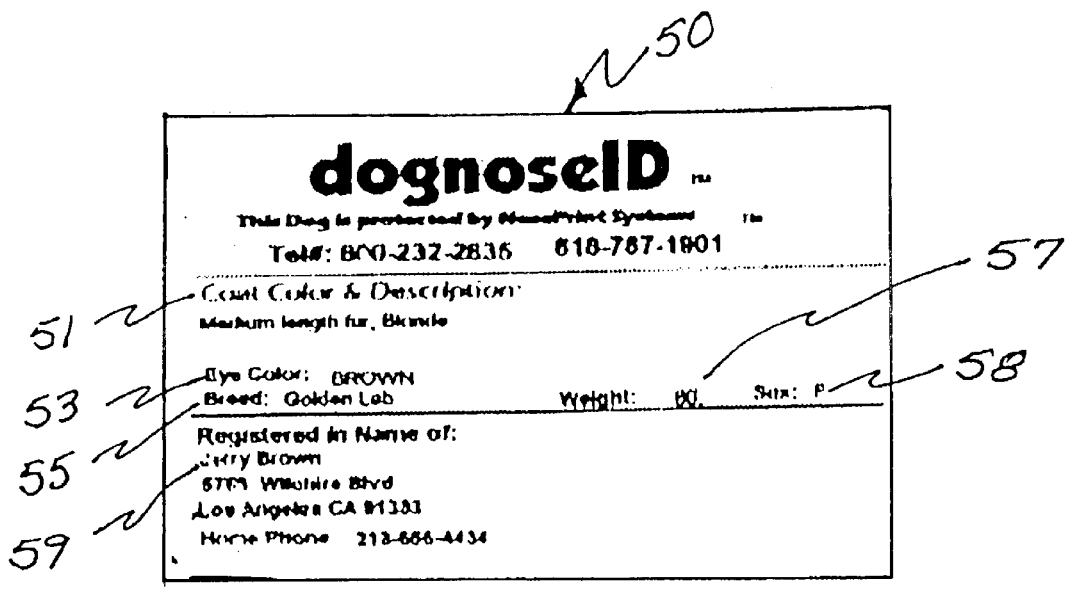
FIG. 13 is a front elevational view of a noseprint identification card with the rear view of said card containing information similar to that shown in FIG. 3 according to the invention.
Figure 14:
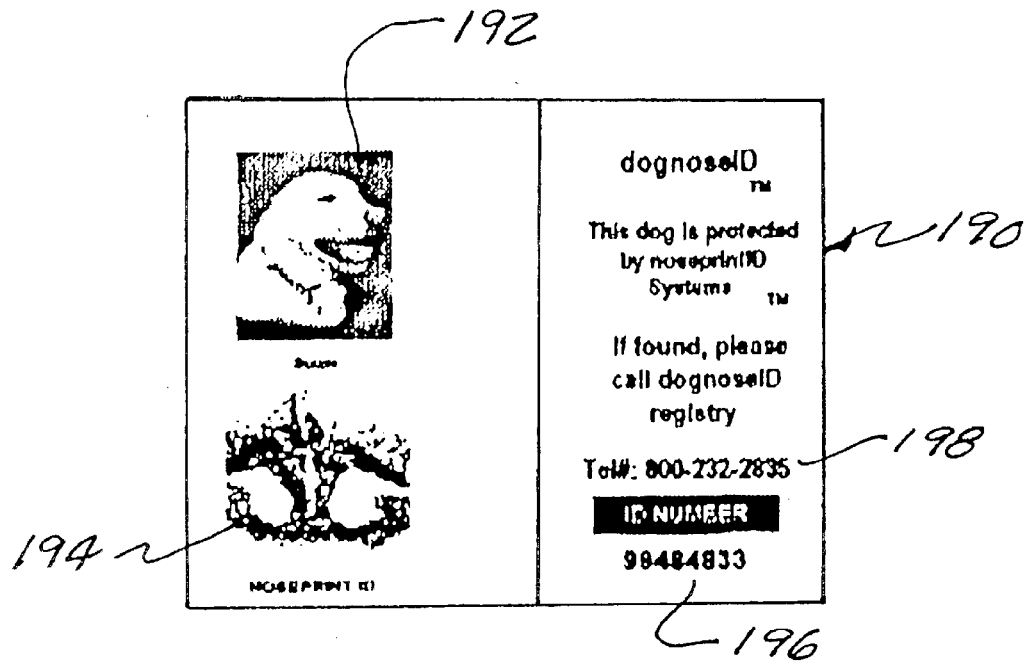
FIG. 14 illustrates a pet collar tag for identifying a pet utilizing the registration and identification system according to the invention.

The system in addition to producing the identification card 50 of FIGS. 3 and 13 can also produce a collar tag 190 (FIG. 14) for attachment to a dog's collar. The collar will include a laminated photograph 192 of the dog, a copy of the noseprint 194, the identification number 196 of the dog, and indicate a telephone number for the finder to call should a lost dog be recovered. The caller can then give the identification number on the tag to the central headquarters 14 and the owner can be located as shown in the flow diagram of FIG. 10. If a lost or stray dog does not have a collar tag, a noseprint can be obtained by any of the methods disclosed and sent to central headquarters. If the dog's noseprint is in the database, the owner can be identified and reunited with his dog.

Thus there has been disclosed a unique system for identifying pets and more particularly dogs, for recovering lost dogs, and maintaining a database to identify dogs. The system includes several methods for acquiring an accurate and in-focus noseprint of a dog which is unique to each animal. Noseprints of pets provide unique identification and are a practical, proven, reliable method. Finding 12 to 25 points of identical characteristics in a pair of noseprints is generally considered sufficient proof that both prints were taken from the same dog. Good noseprints taken from a dog have proven reliable for identification purposes.

The system and method can use an inking or inkless method to obtain a noseprint or a closeup, in-focus photograph of a nose using a closeup camera. The noseprint, a photograph, and data identifying a dog as well as the dog owner are then entered into a central headquarters database and identification number assigned to the dog including an account number for the location where the account was generated. The system can then be used to locate a lost dog either by the identification number or by using a pattern recognition system to compare noseprints.

This invention is not to be limited by the embodiment shown in the drawings and described in the description which is given by way of example and not of limitation, but only in accordance with the scope of the appended claims.

What is claimed is:

1. A pet identification method comprising;

forming a flexible pad having a window;

covering said window with flexible plastic material having an interior side and exterior side;

coating said interior side with an indelible ink, said interior coated with indelible ink being away from said exterior side to be applied to a pets nose;

forming a registration form on having a shape and size equal to said flexible pad;

covering said window with said registration form so that said registration form is spaced from and aligned with said interior side coated with indelible ink;

pressing said exterior side of said flexible plastic material against a pet's nose until said interior side with said indelible ink firmly abuts said registration form producing a clear print of said pets nose;

photographing said pet;

collecting identifying data entering said noseprint, about said pet;

said photograph and data into a database;

whereby a lost pet can be accurately and quickly identified by retrieving and comparing a lost pet's noseprint with noseprints in said database and related data.

2. The method according to claim 1 in which said pet is a dog.

3. The method according to claim 1 including printing identification card for an owner.

4. The method according to claim 1 in which said printed identification card is printed with a description of the animal, color, breed, weight, sex, name of owner, photograph of animal, identification number, and noseprint.

5. The method according to claim 1 including searching said database; said search through said database comprising; pattern matching a lost pet's noseprint with a noseprint in said database.

6. The method according to claim 5 including producing lost pet notices regarding whether a match is found in said database; transmitting said notices to locations where a lost pet may be kept.

7. The method according to claim 1 including receiving a form with information regarding a lost pet; entering data regarding said lost pet into said database system; searching said database for data corresponding to information on said form; producing lost pet notices from the data found in the database search; transmitting the lost pet notices to locations where a lost pet may be found.

8. The method according to claim 7 including searching said database for a corresponding pet identification and owner name.

9. The method according to claim 1 in which said printable material comprises a registration form having an area for said noseprint and areas for entering data about said pet.

10. A pet identification system comprising;
a flexible plastic material having an interior side and exterior side attached to said flexible pad and covering said window;
a coating of ink on said interior side of said flexible plastic window; a registration form covering such window aligned with and on an opposite side of said flexible pad from said interior side of said flexible plastic material having said ink;
whereby when said exterior side of said flexible plastic window is firmly pressed on a pet's nose an accurate copy of the pets nose is imprinted on said registration form.

11. The system according to claim 10 in which said ink is an indelible ink.

12. The system according to claim 11 in which said registration form includes data recording areas for recording identifying data about said pet.

13. The system according to claim 12 including a database; said noseprint and said identifying data about said pet being stored in said database.

14. The system according to claim 13 in which said database includes a program for comparing a stored noseprint and identifying data with a noseprint and identifying data of a lost pet; whereby a lost pet can be quickly and accurately identified.

15. A pet identification method comprising;
taking a closeup photograph of a pets nose to acquire a noseprint, said nose photograph being taken by a high-magnification camera having a magnification of at least 3×;
taking a photograph of said pet;
collecting identifying data about said pet on a database registration form;
storing said noseprint, said photograph and registration data in a central database;
assigning an identification number to said pet;
providing a search engine for searching said central database to retrieve registration data and a noseprint;
providing a comparison program for comparing said registration data and noseprint in said central database with data and a noseprint received about a lost pet;
connecting said central database to a network to receive data and a noseprint about a lost pet and transmitting the result of said comparison program;
whereby a lost pet can be identified by retrieving data or said noseprint from said database.

16. A pet identification method according to claim 15 in which said high-magnification camera has a focus system of a pair of light beams that are in correct focus when said two beams come together as a single beam.

17. A pet identification method according to claim 15 in which said magnification is up to 5×.

* * * * *